United States Patent
Hayama et al.

(10) Patent No.: US 7,339,550 B2
(45) Date of Patent: Mar. 4, 2008

(54) ANTENNA AND RFID TAG

(75) Inventors: Kosuke Hayama, Kyoto (JP); Keisuke Saito, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 11/588,273

(22) Filed: Oct. 27, 2006

(65) Prior Publication Data
US 2007/0200782 A1    Aug. 30, 2007

(30) Foreign Application Priority Data
Feb. 24, 2006   (JP)   ............................ P2006-047867

(51) Int. Cl.
*H01Q 1/36* (2006.01)

(52) U.S. Cl. .................... 343/895; 343/795; 340/572.7

(58) Field of Classification Search ......... 343/700 MS, 343/795, 895; 340/572.5, 572.7; 235/492
See application file for complete search history.

(56) References Cited

U.S. PATENT DOCUMENTS

| | | | |
|---|---|---|---|
| 6,121,878 A * | 9/2000 | Brady et al. ............. | 340/572.1 |
| 6,281,794 B1 * | 8/2001 | Duan et al. ............. | 340/572.1 |
| 2006/0054710 A1 * | 3/2006 | Forster et al. ............ | 235/492 |
| 2006/0055542 A1 * | 3/2006 | Forster et al. ........... | 340/572.7 |

OTHER PUBLICATIONS

Feb. 14, 2006 Press Release, Omron Corporation, RFID Business Development Department & Translation.
Article in Business & Technology, Feb. 15, 2006, and Translation.
Submission of Certificate for Exceptions to Lack of Novelty & Translation citing Internet cite, no dated!.

* cited by examiner

*Primary Examiner*—Tho Phan
(74) *Attorney, Agent, or Firm*—Dickstein Shapiro LLP

(57) ABSTRACT

An antenna for an RFID tag includes each power feeding parts 11 that is formed of a conductor, meandering parts 13*a* and 13*b* that are formed of conductors shaped as a pair of meandering lines, connected to the power feeding parts 11, and extend from the power feeding parts 11 toward both ends of the power feeding parts 11, respectively, a pair of radiating parts 14*a* and 14*b* that are formed of conductors and connected to outer ends of the pair of meandering parts 13*a* and 13*b*, respectively. The meandering parts 13*a* and 13*b* include a plurality of sides arranged in a longitudinal direction where the meandering parts 13*a* and 13*b* extend. Further, the lengths of portions, where the ends of the radiating parts 14*a* and 14*b* facing the meandering parts 13*a* and 13*b* face the sides closest to the radiating parts 14*a* and 14*b* among the plurality of sides of the meandering parts 13*a* and 13*b* in a direction orthogonal to the longitudinal direction, are smaller than the widths of the widest portions of the radiating parts.

8 Claims, 9 Drawing Sheets

ANTENNA AND RFID TAG

TECHNICAL FIELD

The present disclosure relates to an antenna used in an RFID (Radio Frequency Identification) tag.

RELATED ART

In the related art, various RFID tags (for example, see Patent Document 1: U.S. Pat. No. 6,281,794 (page 1 and FIG. 1)) have been proposed, and it has been conceived that an RFID is used for various purposes. For example, RFID tags are used as labels for baggage of the distribution industry in America where systems using RFID tags used in the UHF band are used. In the distribution industry, the size of the RFID tags is limited by the size of baggage. In particular, since RFID tags having a size of 1×4 inches (about 25 mm×100 mm) are widely used as labels, and RFID tags smaller than the 1×4 inches are widely used as the RFID tags used in the UHF band.

However, the RFID tags of the related art, in particular, small RFID tags smaller than a size of 1×4 inches for a UHF band has a problem in that it is difficult to sufficiently increase a bandwidth. Available frequency band assigned to a RFID tag system using the UHF band is different in each country, for example, in Japan the range is 948 to 956 MHz, in America 902 to 928 MHz, in Europe 865 to 868 MHz, in China 918 to 952 MHz. For this reason, RFID tags corresponding to each frequency need to be designed to provide the RFID tags using the UHF band that can be used in the countries where the different frequency bands of the RFID tags are used. Specifically, available frequency bands of the RFID tags are determined on the configuration of the antenna of the RFID tag. Accordingly, it is necessary to individually design the antenna of the RFID tag corresponding to the available frequency band so as to change the available frequency band of the RFID tag. As a result, different RFID tags need to be manufactured in each country, thus manufacturing of the RFID tags becomes too complicated. In addition, it is difficult to use the same RFID tags in each country or for different purposes, which is inconvenient.

The bandwidths of the RFID tags do not increase. Accordingly, when the RFID tags are attached to an object as labels, the available frequency bands of the RFID tags changes due to dielectric constants of the materials of the object to which the RFID tags is attached. Therefore, in order to use the RFID tags having predetermined frequency bands, the configurations of the RFID tags, specifically, antennas of the RFID tags, should be modified so as to correspond to the materials of the objects, to which the RFID tags are attached, depending on the kinds of objects to which the RFID tags are attached. Further, the modified RFID tags should be manufactured. Accordingly, the manufacturing of the RFID tags becomes too complicated, as described above.

SUMMARY

Embodiments of the present invention provide an antenna used in an RFID tag and the RFID tag.

According to an aspect of one or more embodiments of the invention, an antenna for an RFID tag includes a power feeding part formed of conductor, meandering parts that are formed of conductors shaped as a pair of meandering lines, connected to the power feeding part, and extend from the power feeding part toward both ends of the power feeding part, and a pair of radiating parts that are formed of conductors and connected to outer ends of the pair of meandering parts, respectively. In this case, the meandering parts include a plurality of sides arranged in a longitudinal direction where the meandering parts extend. Further, the length of portions, where the ends of the radiating parts facing the meandering parts face the sides closest to the radiating parts among the plurality of sides of the meandering parts in a direction orthogonal to the longitudinal direction, are smaller than the widths of the widest portions of the radiating parts.

According to this configuration, it is possible to increase the bandwidth by the radiating parts, and to adjust the length of the path by the meandering parts, thereby improving the radiation efficiency in a desired wavelength range. In addition, it is possible to suppress the electrostatic coupling occurring between the ends of the radiating parts facing the meandering parts and the portions of the radiating parts facing the sides closest to the radiating parts among the plurality of sides of the meandering parts. Therefore, the deterioration of the radiation efficiency can be suppressed in the desired wavelength range. As a result, it is possible to provide an antenna having a large bandwidth.

In the antenna according to the aspect of one or more embodiments of the invention, the widths of the ends of the radiating parts facing the meandering parts may be smaller than the widths of the widest portions of the radiating parts, and the lengths of the sides closest to the radiating parts among the plurality of sides of the meandering parts in the direction orthogonal to the longitudinal direction may be smaller than the widths of the ends of the radiating parts facing the meandering parts.

According to this configuration, it is possible to suppress electrostatic coupling occurring between the portions, which do not face the radiating parts, of the sides closest to the radiating parts among the plurality of sides of the meandering parts and the radiating parts. Therefore, it is possible to improve radiation efficiency.

In the antenna according to the aspect of one or more embodiments of the invention, the widths of the portions of the radiating parts facing the meandering parts may decrease as coming close to the meandering parts.

According to this configuration, as distances between the radiating parts and the meandering parts are decreased, the lengths of portions, where the radiating parts face the meandering parts, in the direction orthogonal to the longitudinal direction are decreased. Therefore, it is possible to decrease the electrostatic coupling, and to improve the radiation efficiency.

In the antenna according to the aspect of one or more embodiments of the invention, the lengths of two or more sides, facing the radiating parts, among the plurality of sides of the meandering parts in the direction orthogonal to the longitudinal direction may decrease as coming close to the radiating parts.

According to this configuration, as distances between the radiating parts and the meandering parts are decreased, the lengths of portions, where the radiating parts face the meandering parts, in the direction orthogonal to the longitudinal direction are decreased. Therefore, it is possible to decrease the electrostatic coupling, and to improve the radiation efficiency.

The antenna according to the aspect of one or more embodiments of the invention may further include a matching circuit that is connected to the power feeding part.

According to this configuration, it is possible to provide an antenna having a large bandwidth.

In the antenna according to the aspect of one or more embodiments of the invention, the plurality of sides may extend in the direction orthogonal to the longitudinal direction.

According to this configuration, it is possible to provide an antenna having a large bandwidth.

In the antenna according to the aspect of one or more embodiments of the invention, the antenna may be an antenna for a UHF band, and the antenna may have a size equal to or smaller than a size of 25×100 mm.

According to this configuration, it is possible to provide an antenna for a small RFID tag that is used in a UHF band and has a large bandwidth.

According to another aspect of one or more embodiments of the invention, an RFID tag includes the above-described antenna, an integrated circuit that is connected to the power feeding part of the antenna, and a dielectric substrate on which the antenna is disposed.

According to this configuration, it is possible to provide an RFID tag having a large bandwidth.

Various implementations may include one or more the following advantages. For example, it is possible to provide an antenna having a large bandwidth. Therefore, for example, it is possible to increase the frequency bandwidth to which the antenna can correspond. As a result, the antenna can be modified depending on a band where the antenna is used. Further, it is possible to reduce the frequency changing the manufacture of an antenna or an RFID tag depending on a band where the antenna is used, thereby improving the efficiency of manufacturing an antenna or an RFID tag. In addition, because the RFID tag needs to be used so as to correspond to each use, it is possible to improve convenience.

DETAILED DESCRIPTION

Hereinafter, embodiments of an antenna will be described with reference to the drawings. In addition, since elements having the same reference numerals perform the same operation in the embodiment, the description thereof will be omitted so as to avoid repeating the description.

First Embodiment

Figure 1A:
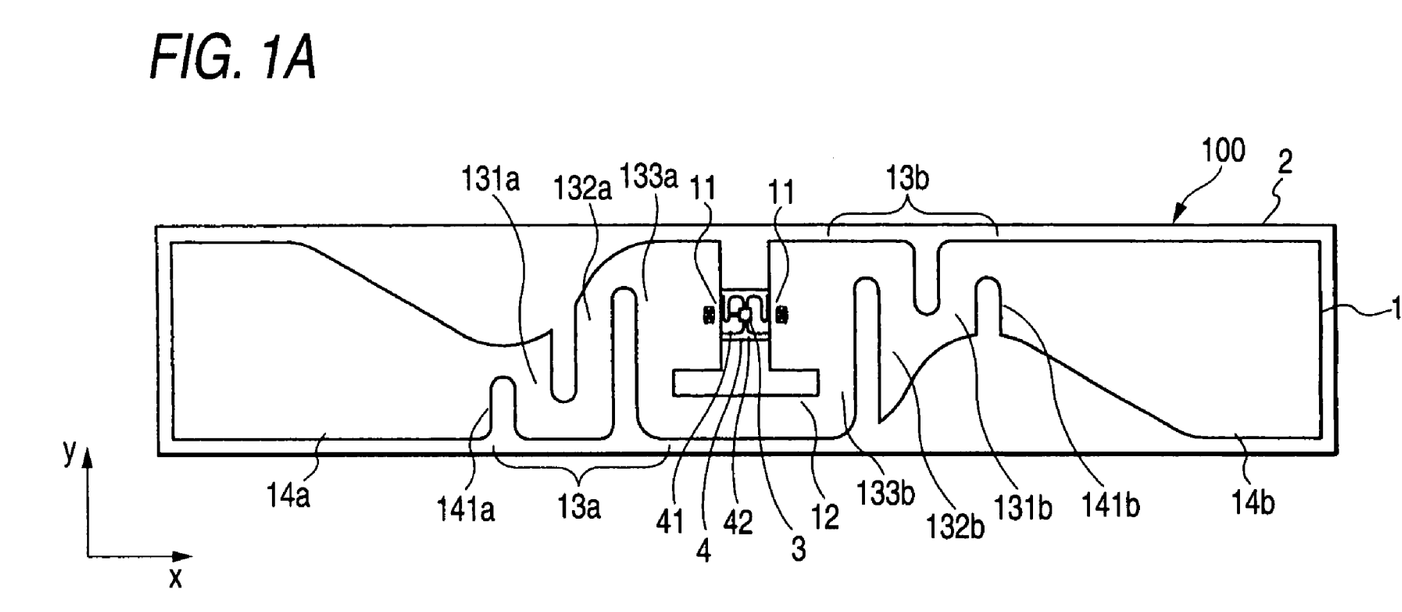
FIG. 1A is a plan view of an RFID tag according to a first embodiment of the invention.
Figure 1B:
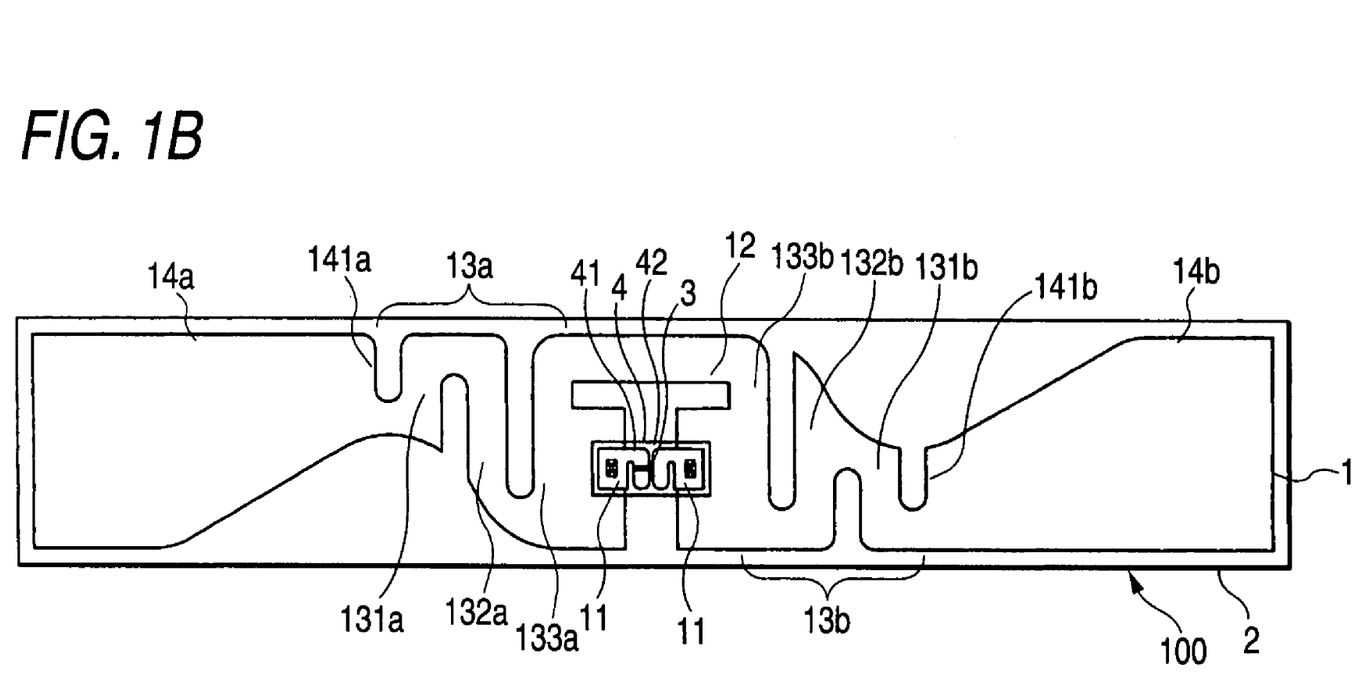
FIG. 1B is a bottom view of the RFID tag according to the first embodiment of the invention.
Figure 1C:
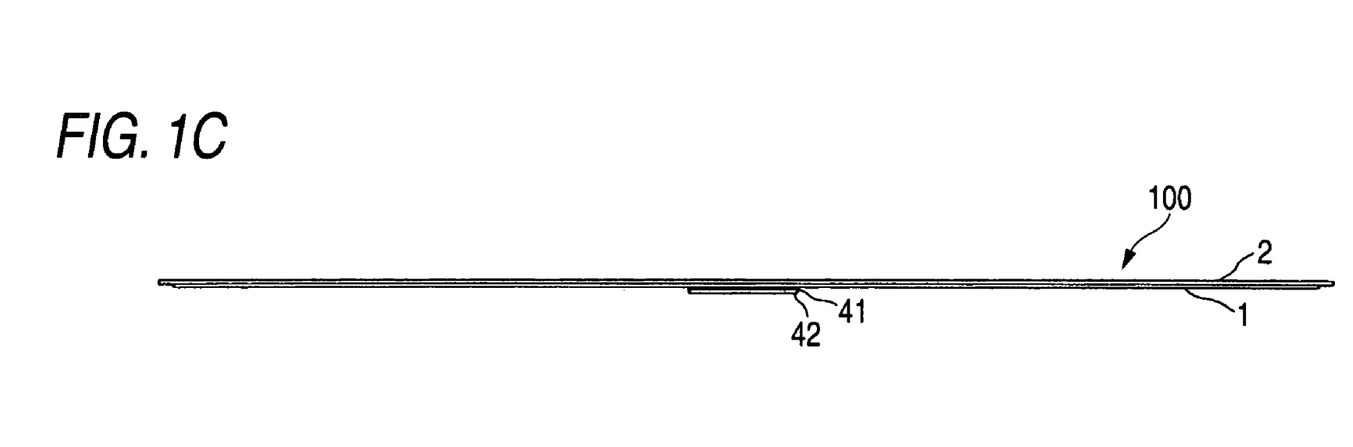
FIG. 1C is a front view of the RFID tag according to the first embodiment of the invention.
Figure 1D:
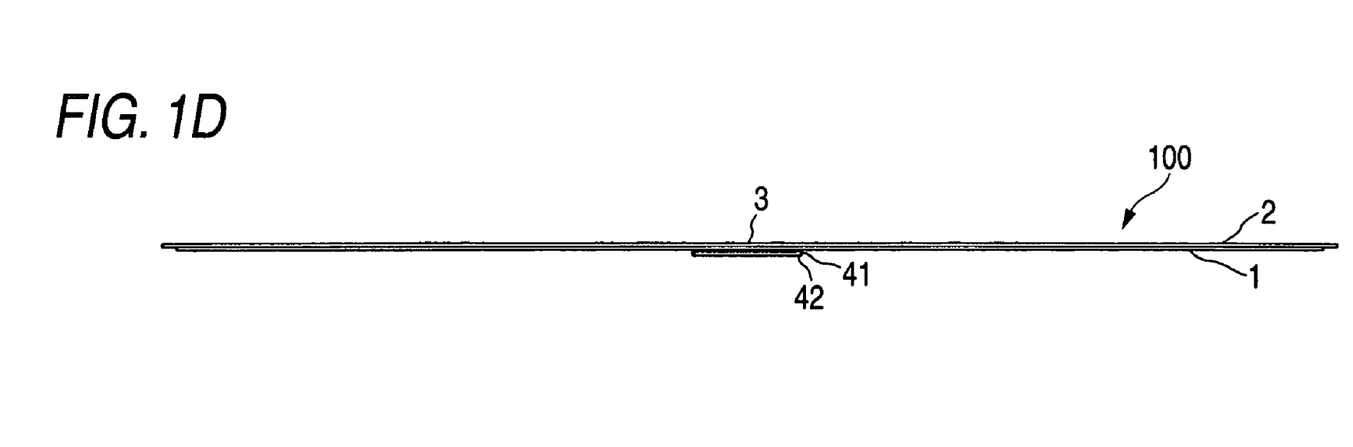
FIG. 1D is a rear view of the RFID tag according to the first embodiment of the invention.
Figure 1E:
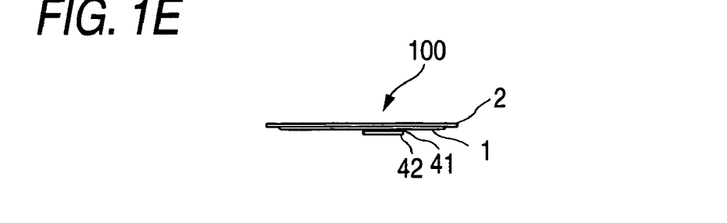
FIG. 1E is a right side view of the RFID tag according to the first embodiment of the invention.
Figure 1F:
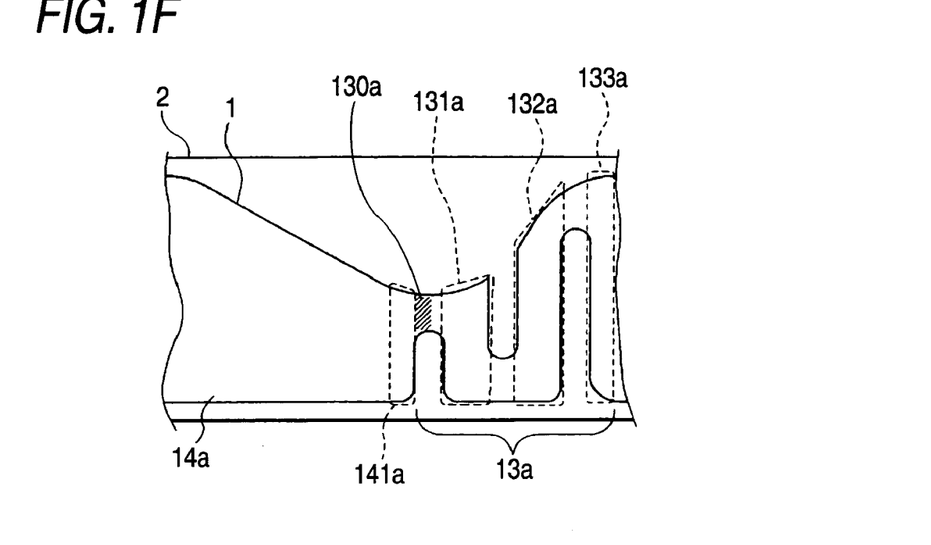
FIG. 1F is an enlarged view of the main parts of the RFID tag according to the first embodiment of the invention.
Figure 1G:
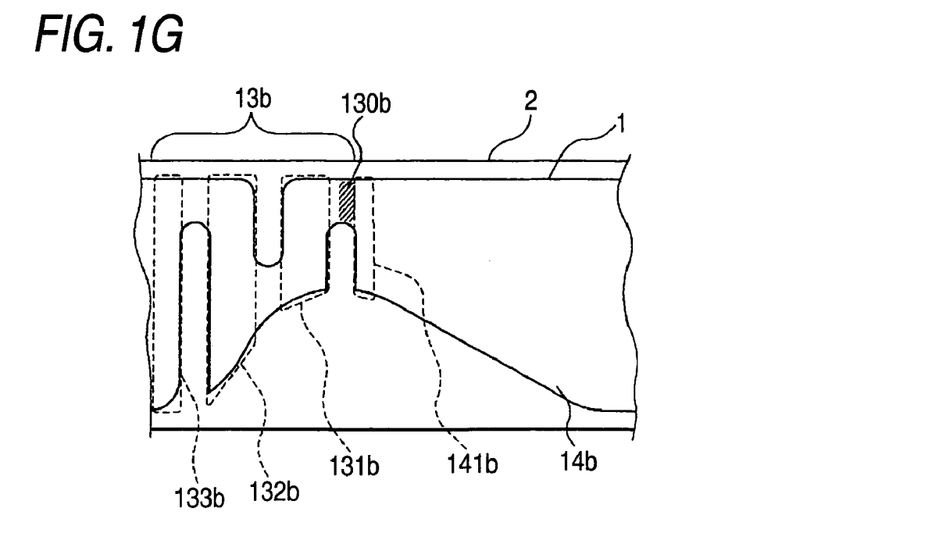
FIG. 1G is an enlarged view of the main parts of the RFID tag according to the first embodiment of the invention.

FIG. 1A is a plan view showing the configuration of an RFID tag according to this embodiment. FIG. 1B is a bottom view showing the configuration of the RFID tag according to this embodiment. FIG. 1C is a front view showing the configuration of the RFID tag according to this embodiment. FIG. 1D is a rear view showing the configuration of the RFID tag according to this embodiment. FIG. 1E is a right side view showing the configuration of the RFID tag according to this embodiment. FIG. 1F is an enlarged view of a portion where a meandering part 13a and a radiating part 14a are connected in the RFID tag according to this embodiment. FIG. 1G is an enlarged view of the vicinity of a portion where a meandering part 13b and a radiating part 14b are connected in the RFID tag according to this embodiment. Further, since a left side view and a right side view are symmetrical, the left side view will be omitted. In the drawings, the RFID tag 100 includes an antenna 1, a dielectric substrate 2, an integrated circuit 3, and a strap 4. In addition, the antenna 1 includes power feeding parts 11, a matching circuit 12, a pair of meandering parts 13a and 13b, and a pair of radiating parts 14a and 14b.

The antenna is used to transmit and receive an electric wave. The antenna may be made of any material as long as the antenna is made of conductor. In general, a filmy conductor, for example, metal is used as the antenna 1. However, the thickness of the conductor is not limited. Here, the following antenna will be described. The antenna 1 is made of aluminum and has a uniform thickness of about 15 µm. Further, the antenna 1 has a length of 94 mm in the longitudinal direction and a width of 16.025 mm. However, a size of the antenna 1 can be modified depending on the band of where the antenna 1 is used. Furthermore, the antenna 1 is disposed on the rear surface of the dielectric substrate 2 in this embodiment.

Each of the power feeding parts 11 is a terminal that is formed of a conductor and used to input and output current between the other elements and the antenna 1. The power feeding parts 11 are connected to the integrated circuit 3 so as to input and output current between the antenna 1 and the integrated circuit 3. Here, a slit is provided at the center of each power feeding part 11, and the integrated circuit 3 is connected to the centers of the power feeding parts 11 so that the integrated circuit 3 bridges the slit. The shape of each power feeding part 11 is not limited.

The matching circuit 12 is a circuit that is connected with the power feeding parts 11 and matches the impedances the antenna 1 and the integrated circuit 3. Here, an antenna provided with a so-called T-shaped matching circuit formed of a conductor will be described as an example of the antenna. The matching circuit 12 is integrally formed with other parts of the antenna 1. In addition, since the configuration of the matching circuit, such as a T-shaped matching circuit, is known to those in the art, the description thereof will be omitted. Further, when it is not necessary to match the impedances, for example, the impedances are matched between the integrated circuit and the antenna, the matching circuit 12 may be omitted.

The meandering parts 13a and 13b are a pair of linear portions that are formed of conductors and connected to the power feeding parts 11, respectively. Further, the pair of linear portions of the meandering parts 13a and 13b extends from centers of the power feeding parts 11 toward the ends of the power feeding parts 11, respectively. Specifically, the meandering parts 13a and 13b extend from the power feeding parts 11 in directions opposite to each other. Hereinafter, an extension direction of the meandering parts 13a and 13b is referred to as a longitudinal direction, and a length in a direction orthogonal to the longitudinal direction is referred to as a width. An X-axis direction in FIG. 1A corresponds to the longitudinal direction. The longitudinal direction corresponds to a longitudinal direction of the antenna 1. Since linear conductors forming the meandering parts 13a and 13b meander, a path through which current flows can be lengthened in a restricted area. Here, the meandering part described herein includes a structure called a meander-line. The "meandering" described herein indicates a state so as to extend to the right and left sides in an alternately curved shape. The starting directions of the meandering parts 13a and 13b are not limited. In addition, the meandering parts 13a and 13b may be symmetrical, or may not be symmetrical. Curved portions of the meandering parts 13a and 13b may have rounded corners or rectangular corners, and the shape of the curved portion is not limited. In addition, the meandering part 13a includes a plurality of sides 131a, 132a, and 133a that are formed of the meandering linear conductors and arranged in the longitudinal direction. Further, the meandering part 13b includes a plurality of sides 131b, 132b, and 133b that are formed of the meandering linear conductors and arranged in the longitudinal direction. These sides are shown in FIGS. 1F and 1G so as to be surrounded by dotted lines. Here, specifically, the plurality of sides 131a, 132a, 133a, and 131b, 132b, 133b extend in the direction orthogonal to the longitudinal direction. However, all or a part of the sides may also be inclined at any angle with respect to the direction orthogonal to the longitudinal direction. As described above, the meandering parts meander so that the sides 113a, 132a, 133a, and 131b, 132b, 133b parallel to each other are arranged. Accordingly, it is advantageous to lengthen the path through which current flows, in a restricted area. Hereinafter, each of the plurality of sides arranged in the longitudinal direction of the meandering parts 13a and 13b is simply referred to as a side. Further, the linear conductors forming the meandering parts 13a and 13b have predetermined sizes. In addition, the sizes of the linear conductors are not limited, and may not be uniform. In the meandering part 13a, the lengths of the sides 131a and 132a in the direction orthogonal to the longitudinal direction decrease as coming close to the radiating part 14a. In the meandering part 13b, the lengths of the sides 131b and 132b in the direction orthogonal to the longitudinal direction decrease as coming close to the radiating part 14b. A case that "the lengths are decreased as coming close to the radiating part" includes when the lengths are continuously decreased as coming close to the radiating part, and when the lengths are stepwise decreased as coming close to the radiating part. "The lengths continuously decrease" means, for example, that the length of the side decreases for each adjacent side. Further, "the lengths are stepwise decreased" means, for example, that the length of the side decreases for the plurality of sides. The example shown is the lengths that continuously decrease as coming close to the radiating part. In addition, when each of the meandering parts 13a and 13b includes two or more sides, the lengths of two or more sides, facing the radiating parts, among the plurality of sides of the meandering parts 13a and 13b in the direction orthogonal to the longitudinal direction may decrease as coming close to the radiating parts 14a and 14b. The configuration of the meandering parts 13a and 13b will be described in detail below.

Each of the radiating parts 14a and 14b are formed of a conductor. The radiating parts 14a and 14b are connected to the outer ends 130a and 130b of the meandering parts 13a and 13b. Furthermore, the outer ends 130a and 130b of the meandering parts 13a and 13b are hatched portions in FIGS. 1F and 1G, respectively. The radiating parts 14a and 14b are so-called radiating plates, and are mainly used to radiate or receive an electric wave. Each of the radiating parts 14a and 14b generally has a flat surface having a predetermined shape. However, part of the openings may be provided at the portion that does not significantly effect the radiating of the electric wave. A case that the widths of the portions, close to the meandering parts 13a and 13b, of the radiating parts 14a and 14b are decreased as coming close to the meandering parts 13a and 13b is shown herein as an example. A case that "the widths are decreased as coming close to the meandering parts" includes when the widths continuously decrease as coming close to the meandering part, and when the widths stepwise decrease as coming close to the meandering parts. "The widths continuously decrease" means, for example, the widths of the radiating parts at positions close to the radiating parts 14a and 14b are necessarily smaller than the widths thereof at positions far from the radiating parts 14a and 14b. Further, "the widths stepwise decrease" means, for example, that the widths of the radiating parts at positions close to the radiating parts 14a and 14b are equal to or smaller than the widths thereof at positions far from the radiating parts 14a and 14b. A case that the widths are continuously decreased as coming close to the meandering part is shown herein as an example. In addition, the widths to be decreased of the radiating parts 14a and 14b are not limited. The portions of the ends 141a and 141b, which are close to the meandering parts 13a and 13b but not connected thereto, of the radiating parts 14a and 14b face the meandering parts 13a and 13b. The ends 141a and 141b, which are close to the meandering parts 13a and 13b, of the radiating parts 14a and 14b are shown in FIGS. 1F and 1G so as to be surrounded by dotted lines. Here, a case that each of the radiating parts 14a and 14b is formed in a rectangular shape having a notched vertex is shown herein as an example. The configuration of the radiating parts 14a and 14b will be described in detail below.

The dielectric substrate 2 is used to dispose and fix the antenna 1 thereon. In addition, the dielectric substrate 2 may be used to dispose and fix the integrated circuit 3 or a strap 4 thereon. For example, here, the antenna 1 is provided on the rear surface of the dielectric substrate 2. Further, the strap 4 is pressed against and bonded to the dielectric substrate 2 at a position corresponding to the power feeding parts 11 so that wiring lines provided on the rear side of the strap 4 are connected to the power feeding parts 11. The dielectric substrate 2 is formed of a dielectric material, such as polyethylene terephthalate (PET) or epoxy resin. The thickness of the dielectric substrate 2 is not limited. However, if the dielectric substrate 2 is used for an RFID tag 100 that is used in an IC card or a luggage label, the dielectric substrate is thin. Furthermore, the dielectric substrate may be formed of a flexible material. Here, a transparent PET film having a thickness of about 38 μm is used as the dielectric substrate 2. In general, the size of the dielectric substrate 2 defines the size of the RFID tag. For example, the size of the dielectric substrate 2 is equal to or smaller than the size of the label commonly used in an American distribution industry, that is, the size of about 1×4 inches.

The integrated circuit 3 is connected to the power feeding-parts 11. The integrated circuit 3 has a function of a transceiver that transmits and receives discriminating information through the antenna 1. In addition, the integrated circuit 3 is operated by the current that is fed from the antenna 1 through the power feeding parts 11. Any integrated circuit that is used as an integrated circuit of a common RFID tag may be used as the integrated circuit 3, and the detailed description thereof will be omitted. The thickness of the integrated circuit 3 is not limited. According to this embodiment, the integrated circuit 3 is interposed between the surface of the strap 4 and the rear surface of the dielectric substrate 2 in a space between the power feeding parts 11. Accordingly, it is preferable that the size of integrated circuit is capable of being disposed in the space. Since the dielectric substrate 2 and a dielectric substrate 42 of the strap 4 are flexible, it is possible to dispose the integrated circuit 3 having a large thickness than the antenna 1, for example, the integrated circuit 3 having a thickness of about 150 to 180 μm in the space.

The strap 4 is a member that is used to connect the integrated circuit 3 to the power feeding parts 11 of the antenna 1 and to fix the integrated circuit 3 to the dielectric substrate 2. The strap 4 has the same configuration as the antenna 1 and the dielectric substrate 2, except for the size thereof. In the strap 4, a filmy wiring line 41 is provided on the surface of the dielectric substrate 42, and the integrated circuit 3 is bonded on the surface of the strap 4 so as to be connected to the wiring line 41. The dielectric substrate 42 has, for example, a thickness of about 25 μm, a length of about 4 mm, and a width of about 9 mm. In this embodiment, the wiring line 41 has, for example, a thickness of about 35 μm, a length of about 3 mm, and a width of about 8 mm. The wiring line 41 is formed by using the same method as the antenna 1. For example, the integrated circuit 3 is bonded to the wiring line 41 by solder or conductive adhesive. A method of bonding the integrated circuit 3 is not limited. The strap 4 is connected to the antenna 1 and the dielectric substrate 2 so that the wiring line 41 is connected to the power feeding parts 11 on the dielectric substrate 2. In this embodiment, the surface of the strap 4 is attached to the rear surface of the dielectric substrate 2 so as to face the rear surface of the dielectric substrate 2. As a result, the integrated circuit 3 is interposed between the strap 4 and the dielectric substrate 2 in the space formed in the power feeding parts 11. For example, the strap 4 includes an electrode (not shown), which is connected to a wiring line 41, on the surface thereof as disclosed in U.S. Pat. No. 6,664,645. The surface of the strap is disposed to face the surface, on which a hot melt adhesive is applied, of the dielectric substrate 2, that is, the surface on which the antenna 1 or the like is provided. Then, while an ultrasonic wave is applied, the strap and the dielectric substrate are pressed against each other. Therefore, the antenna 1 and the dielectric substrate 2 are bonded to each other so that the electrode and the power feeding parts 11 provided on the rear surface of the dielectric substrate 2 are connected to each other. As a result, the power feeding parts 11 and the integrated circuit 3 are connected to each other. However, a method of bonding the strap is not limited. In addition, as long as the integrated circuit 3 is electrically connected to the power feeding parts 11, any method may be used to connect the integrated circuit 3 with the power feeding parts 11. For example, as shown in FIG. 1, the integrated circuit 3 does not need to be connected to the power feeding parts 11, that is, the power feeding parts 11 may be directly connected to the integrated circuit 3 without the strap 4.

For example, after rolled aluminum is bonded on the rear surface of the dielectric substrate 2 so as to form an aluminum layer on the rear surface of the dielectric substrate, a mask is formed on the aluminum layer by gravure printing or photolithography printing. Subsequently, the whole mask is used as an etching mask, the dielectric substrate is etched by acid or alkali to form the antenna 1 of the RFID tag 100. However, a method of forming the antenna 1 is not limited. For example, the shape of the antenna 1 may be printed on the dielectric substrate 2 by using metal ink to form the antenna 1. Meanwhile, since the method of forming the antenna 1 is well known, the description thereof will be omitted in this specification.

Next, the operation of the RFID tag 100 will be briefly described below. When a carrier wave radiated from an RFID reader-writer (not shown) reaches the antenna 1, power obtained by the antenna from the carrier wave is supplied to the integrated circuit 3 through the strap 4. The integrated circuit 3 operates on the basis of signals included in the carrier wave, for example, reads the discriminating information from a memory, by means of the supplied power. The carrier wave received from the RFID reader-writer is used as a wave source so that the information obtained, as a result of the operation, is transmitted through the antenna 1.

In the RFID tag 100, the radiating parts 14a and 14b are provided in order to increase the bandwidth. By providing the flat radiating parts 14a and 14b, various paths having different lengths, through which the current flows, can be obtained in the radiating parts 14a and 14b. A wavelength range in which the antenna 1 can efficiently radiate or absorb the electric wave is determined depending on the substantial path lengths in the antenna. Therefore, such the radiating parts 14a and 14b provides substantially a plurality of path lengths in the antenna 1, thereby increasing the bandwidth of the antenna 1. Further, the larger the size of the radiating parts 14a and 14b become, the larger the bandwidth becomes.

However, an area required for the antenna 1 is restricted in the RFID tag 100. Accordingly, when the radiating parts 14a and 14b requiring a large area are mounted in the antenna 1, the length of the path is shortened in the entire antenna 1. In addition, it is not possible to ensure the length of the path corresponding to an electric wave in a desired wavelength range, particularly, in the UHF band. Therefore, the antenna 1 cannot efficiently radiate or absorb the electric wave in a desired wavelength range. In case of a so-called dipole antenna according to this embodiment, the length of the antenna required to have the original characteristic thereof is a half (about 150 mm in the UHF band) a wavelength of where the antenna is used. However, in particular, when the antenna is used in the UHF band, the length of the label size in the longitudinal direction is about 100 mm in respect to the label size of 1×4 inches. Therefore, in order to have the original characteristic of the antenna, the substantial length of the path in the antenna cannot be about 150 mm by only mounting the radiating parts in the antenna.

For this reason, according to the RFID tag 100 of this embodiment, the meandering parts 13a and 13b are provided between the radiating parts 14a and 14b and the power feeding parts 11. Since the meandering parts 13a and 13b are provided, it is possible to ensure the length of the path suitable for a desired wavelength range, particularly in the UHF band in the restricted region except for the radiating parts 14a and 14b having relatively large area, of the regions where the antenna can be disposed.

As a result, according to the RFID tag 100, the flat radiating parts 14a and 14b increase the bandwidth, and meandering parts 13a and 13b can allow the length of the path to correspond to the desired wavelength range, such as the UHF band, in the restricted region. Therefore, it is regarded that the bandwidth can be increased in the desired wavelength range, such as the UHF band.

The radiating part and the meandering part are disposed in the restricted region. Accordingly, when the flat radiating part and the meandering part are disposed next to each other, electrostatic coupling occurs between the end of the radiating part facing the meandering part and the side of the meandering part closest to the radiating part. As a result, because the length of the path changes, radiation efficiency deteriorates in the desired wavelength range. In particular, when the radiating part and the meandering part set to be used in the UHF band are disposed in a size equal to or smaller than the size of 1×4 inches, a distance between the radiating part and the meandering part is remarkably decreased. Due to the above, electrostatic coupling easily occurs. Here, the side of the meandering part closest to the radiating part is the side closest to the radiating part of sides except for the side coming in direct contact with the radiating part.

For this reason, in the antenna 1 of the RFID tag 100 according to this embodiment, the radiating parts 14a and 14b and the meandering parts 13a and 13b are formed to have a flat shape. That is, the width of the portion of each of the radiating parts 14a and 14b facing the meandering parts 13a and 13b is continuously or stepwise decreased as coming close to the meandering parts 13a and 13b. In addition, the lengths of two or more sides of the meandering parts 13a and 13b facing the radiating parts 14a and 14b, for example, the lengths of the sides 131a, 132a, and 131b, 132b in the direction orthogonal to the longitudinal direction are continuously or stepwise decreased as coming close to the radiating parts 14a and 14b. As described above, the lengths of portions, where the ends 141a and 141b of the radiating parts 14a and 14b facing the meandering parts 13a and 13b face the sides 131a and 131b being closest to the radiating parts 14a and 14b among the plurality of sides 131a, 132a, 133a, and 131b, 132b, 133b of the meandering parts 13a and 13b, in the direction orthogonal to the longitudinal direction, are smaller than the widths of the widest portions of the radiating parts 14a and 14b, for example, the widths of the ends of the antenna 1. As a result, it is possible to decrease the electrostatic coupling occurring in the portions where the ends 141a and 141b of the radiating parts 14a and 14b facing the meandering parts 13a and 13b face the sides 131a and 131b of the meandering parts 13a and 13b closest to the radiating parts 14a and 14b. Further, it is possible to reduce the change in the length of the path caused by the electrostatic coupling occurring in the portions between the ends 141a and 141b of the radiating parts 14a and 14b facing the meandering parts 13a and 13b, and the sides 131a and 131b of the meandering parts 13a and 13b closest to the radiating parts. Therefore, it is possible to suppress the deterioration of the radiation efficiency in the desired wavelength range. Furthermore, it is possible to sufficiently lengthen the length of the sides formed by meandering at the portions of the meandering parts 13a and 13b that are distant from the radiating parts 14a and 14b. Accordingly, it is possible to ensure the original function of the meandering parts that lengthens the substantial length of the path. In addition, even though the widths of the radiating parts 14a and 14b are continuously or stepwise decreased as coming close to the meandering parts 13a and 13b, it is possible to form various paths. Therefore, it is possible to sufficiently increase the bandwidth of the antenna 1.

According to this embodiment, in particular, the widths of the radiating parts 14a and 14b and the widths of the entire meandering parts 13a and 13b decrease as coming close to the portions where the radiating parts 14a and 14b and the meandering parts 13a and 13b are connected to each other, respectively. As the distances between the radiating parts 14a and 14b and the meandering parts 13a and 13b decrease, the electrostatic coupling also easily occurs in the portions between the portions except for the ends of the radiating parts 14a and 14b facing the meandering parts 13a and 13b, and the sides except for the sides of the meandering parts 13a and 13b closest to the radiating parts 14a and 14b. However, in this embodiment, as the distances between the radiating parts 14a and 14b and the meandering parts 13a and 13b decrease, the lengths of portions, where the radiating parts 14a and 14b face the meandering parts 13a and 13b, in the direction orthogonal to the longitudinal direction decrease. Therefore, it is possible to further decrease the electrostatic coupling, and to improve the radiation efficiency.

Figure 2:
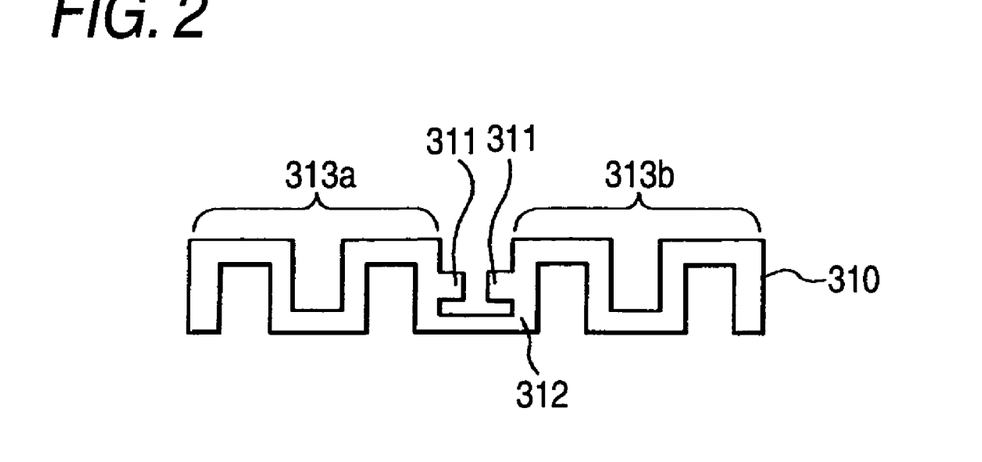
FIG. 2 is a plan view of a sample antenna for a simulation.
Figure 3:
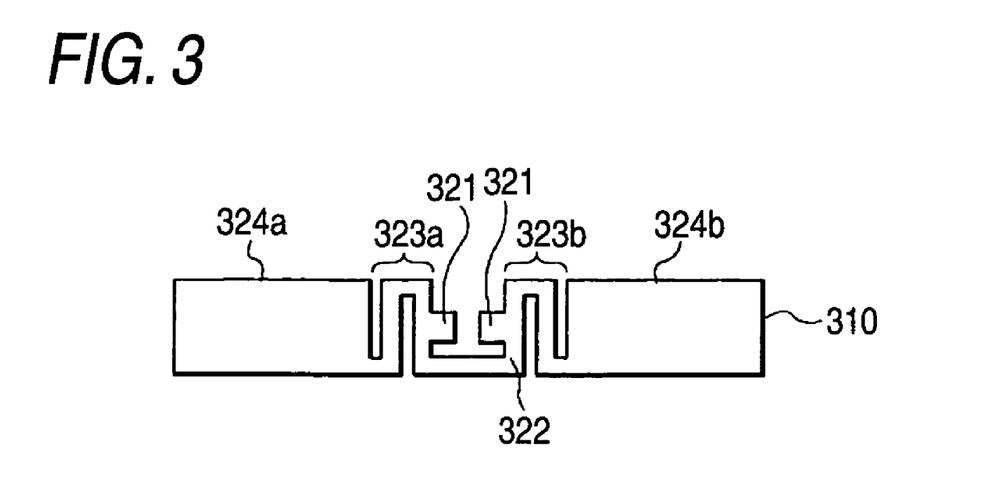
FIG. 3 is a plan view of a sample antenna for the simulation.

FIGS. 2 and 3 are plan views of a sample antenna that is used to compare the sample antenna with the antenna 1 shown in FIG. 1.

An antenna 310 shown in FIG. 2 is made of aluminum and has a thickness of 15 μm, similar to the antenna 1 shown in FIG. 1. In addition, the antenna 310 has a length of 94 mm in the longitudinal direction and a width of 16.025 mm that are the same length and width as the antenna 1 shown in FIG. 1. The antenna 310 includes power feeding parts 311, a matching circuit 312, and meandering parts 313a and 313b.

An antenna 320 shown in FIG. 3 is made of aluminum and has a thickness of 15 μm, similar to the antenna 1 shown in FIG. 1. In addition, the antenna 320 has a length of 94 mm in the longitudinal direction and a width of 16.025 mm that are the same length and width as the antenna 1 shown in FIG. 1. The antenna 320 includes power feeding parts 321, a matching circuit 322, meandering parts 323a and 323b, and radiating parts 324a and 324b. Meanwhile, the entire widths of the meandering parts 323a and 323b and the widths of the radiating parts 324a and 324b are uniformly constant.

Figure 4:
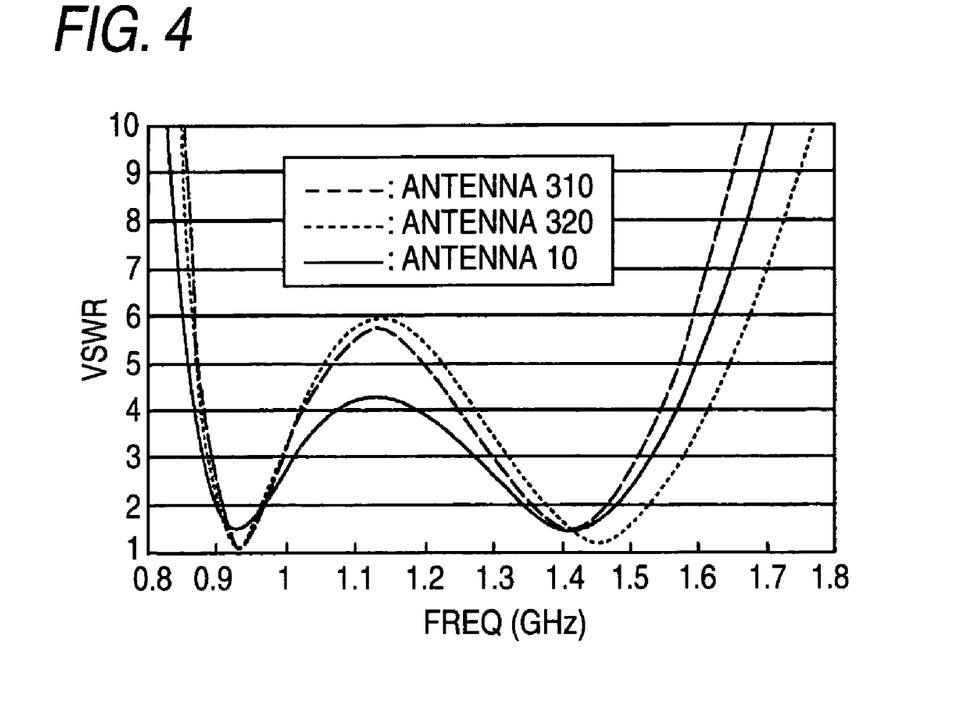
FIG. 4 is a view showing results of the simulation.

In addition, FIG. 4 shows results of a simulation that is performed to obtain a voltage standing wave ratio by means of the antennas shown in FIGS. 1, 2, and 3. In FIG. 4, a horizontal axis represents a frequency of voltage applied to the antennas shown in FIGS. 1, 2, and 3, and a vertical axis represents a voltage standing wave ratio (VSWR) when voltage is applied to the antennas. The VSWR is a value showing the ratio of the maximum value to the minimum value of the standing wave occurring in the transmission line where reflected waves occur. The VSWR shows that the number of incidence of the reflected wave decreases as the value of the VSWR comes close to 1.

Figure 5:
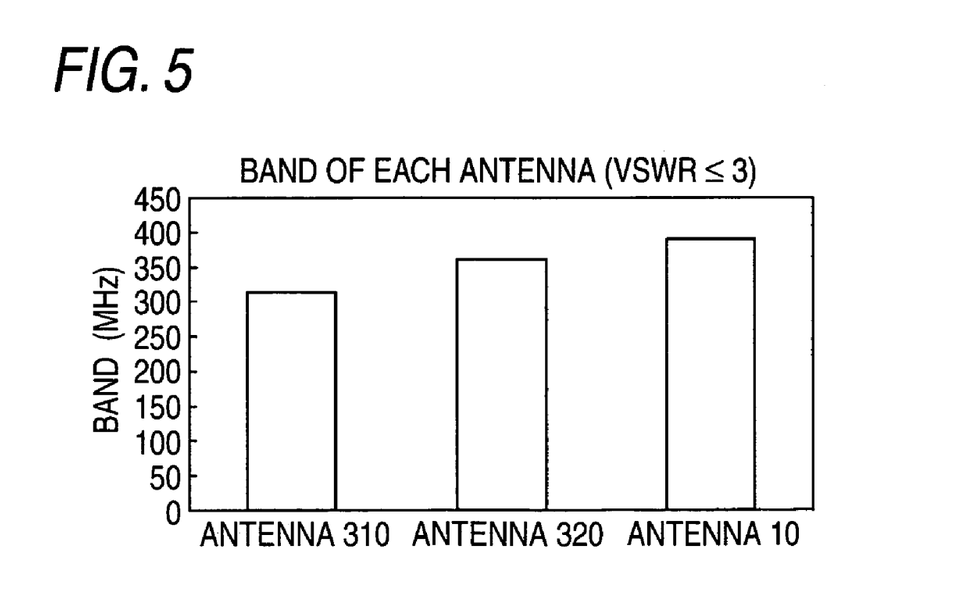
FIG. 5 is a view showing a relationship between the shape and the band of the antenna.

FIG. 5 shows bands, where the value of the VSWR shown in FIG. 4 is equal to or smaller than 3, of the antennas shown in FIGS. 1, 2, and 3. The antenna having the frequency, where the value of the VSWR is equal to or smaller than 3, is regarded to be sufficiently used as the antenna of the RFID tag. For this reason, the sum of the frequency range, where the value of the VSWR is equal to or smaller than 3, is regarded as the band of each antenna.

As shown in FIGS. 4 and 5, the antenna 1 described in this embodiment includes the antenna 310 not having a radiating part or the antenna 320 having the meandering parts 323a and 323b and the radiating parts 324a and 324b. Meanwhile, the VSWR of the antenna 1 is further improved than that of the antenna 320 which has a constant length of the antenna in the direction orthogonal to the longitudinal direction, that is, a constant width. Therefore, it is understood that the bandwidth of the antenna 1 is sufficiently increased.

According to the above-described embodiment, the width of the portion of each of the radiating parts 14a and 14b facing the meandering parts 13a and 13b decreases as coming close to the meandering parts 13a and 13b. In addition, the lengths of two or more sides, which face the radiating parts 14a and 14b, of the meandering parts 13a and 13b among the plurality of sides 131a, 132a, 133a, and 131b, 132b, 133b, for example, the lengths of the sides 131a, 132a, and 131b, 132b in the direction orthogonal to the longitudinal direction decrease as coming close to the radiating parts. Accordingly, the lengths of the portions, where the ends 141a and 141b of the radiating parts 14a and 14b facing the meandering parts 13a and 13b face the sides 131a and 131b being closest to the radiating parts among the plurality of sides 131a, 132a, 133a, and 131b, 132b, 133b of the meandering parts 13a and 13b, in the direction orthogonal to the longitudinal direction, are smaller than the widths of the widest portions of the radiating parts 14a and 14b, for example, the widths of the ends of the antenna 1. Accordingly, the radiating parts 14a and 14b are provided to increase the bandwidth of the antenna, and it is possible to adjust the length of the path by the meandering parts 13a and 13b, thereby improving the radiation efficiency in the desired wavelength range. Furthermore, it is possible to suppress the electrostatic coupling occurring between the radiating parts 14a and 14b and the sides of the meandering parts 13a and 13b closest to the radiating parts 14a and 14b. Therefore, the deterioration of the radiation efficiency can be suppressed in the desired wavelength range. As a result, it is possible to provide an antenna having a large bandwidth and an RFID tag having a large bandwidth.

Meanwhile, the radiating parts 14a and 14b of the antenna 1 according to this embodiment may have openings so as to have a plurality of paths through which current flows.

According to this embodiment, one side of two sides of the radiating part 14a along the longitudinal direction of the RFID tag 100 is inclined toward the inside of the antenna 1. The other side of two sides of the radiating part 14a along the longitudinal direction of the RFID tag 100 is inclined with respect to the longitudinal direction. The width of the portion of each of the radiating parts 14a and 14b facing the meandering parts 13a and 13b decreases as coming close to the meandering parts 13a and 13b. However, the widths of the radiating parts 14a and 14b may decrease as the portions of the radiating parts 14a and 14b facing the meandering parts 13a and 13b come close to the meandering parts 13a and 13b so that only one side of each of the radiating parts 14a and 14b in the longitudinal direction of the antenna 1 is inclined with respect to the longitudinal direction. In addition, the widths of the radiating parts 14a and 14b may decrease as the portions of the radiating parts 14a and 14b facing the meandering parts 13a and 13b come close to the meandering parts 13a and 13b so that both sides of the radiating parts 14a and 14b in the longitudinal direction of the antenna 1 are inclined with respect to the longitudinal direction.

In this embodiment, the meandering part 13a is formed so that the length of one side of two sides of the sides, which forms the meandering part 13a, in the longitudinal direction of the RFID tag 100 decrease as coming close to the radiating part 14a. Furthermore, the meandering part 13b is formed so that the length of the other side of two sides of the sides, which forms the meandering part 13b, in the longitudinal direction of the RFID tag 100 decrease as coming close to the radiating part 14b. Accordingly, the lengths of the sides forming the meandering parts 13a and 13b in the direction orthogonal to the longitudinal direction are decreased as coming close to the radiating parts 14a and 14b. However, the lengths of the side forming the meandering part 13a and the side forming the meandering part 13b in the longitudinal direction of the antenna 1 decrease as coming close to the radiating parts 14a and 14b, so that the lengths of the sides forming the meandering parts 13a and 13b in the direction orthogonal to the longitudinal direction may decrease as coming close to the radiating parts 14a and 14b.

Second Embodiment

An RFID tag according to this embodiment is formed so that the lengths of the sides forming the meandering parts in the direction orthogonal to the longitudinal direction are constant, and the ends of the radiating parts facing the meandering parts are narrower than the widest portions of the radiating parts in the RFID tag 100 according to the first embodiment.

Figure 6:
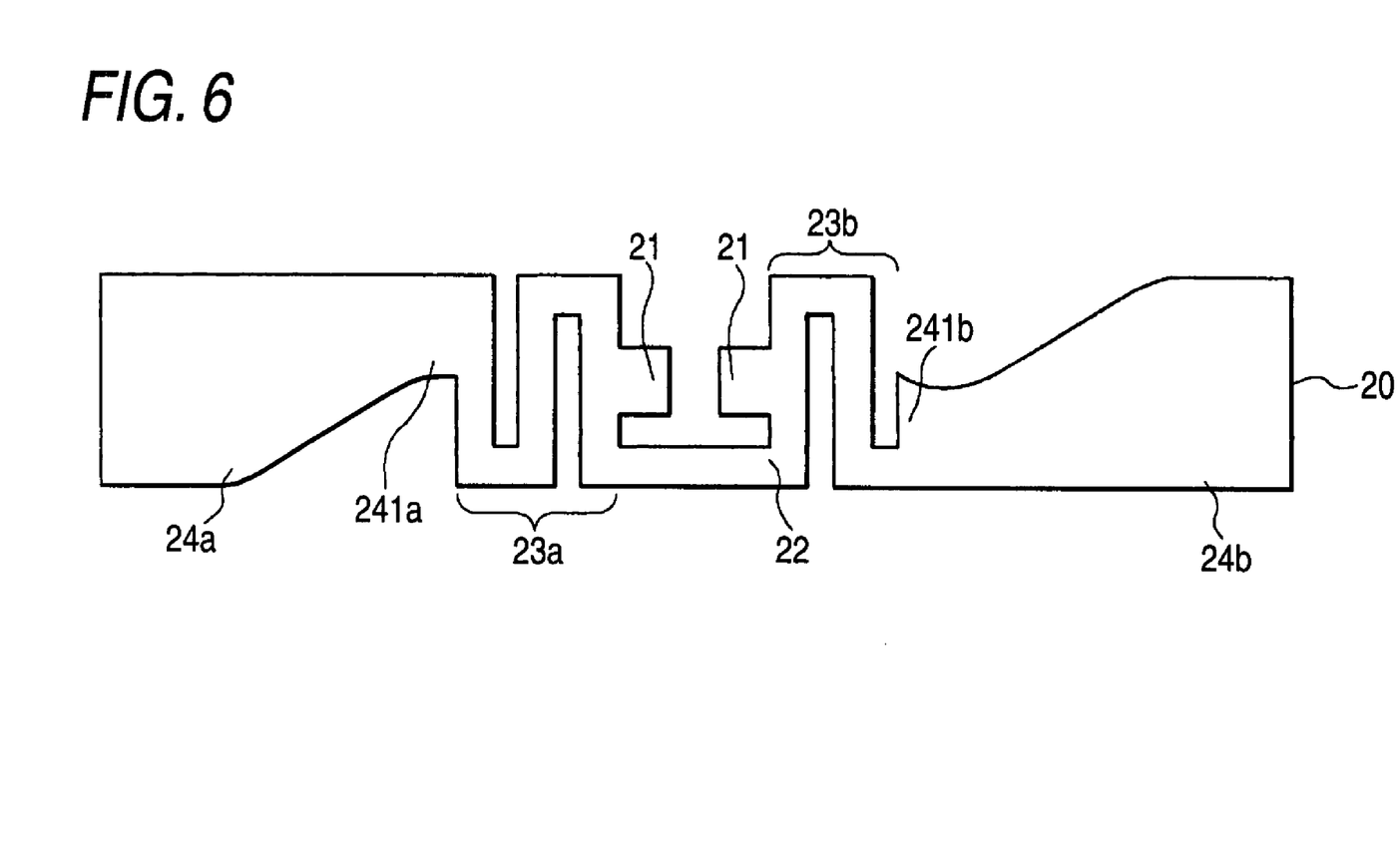
FIG. 6 is a plan view of an antenna according to a second embodiment of the invention.

FIG. 6 is a view showing the configuration of an antenna of the RFID tag according to this embodiment. In FIG. 6, the antenna 20 includes power feeding parts 21, a matching circuit 22, meandering parts 23a and 23b, and radiating parts 14a and 14b. The power feeding parts 21 and the matching circuit 22 have the same configuration as the power feeding parts 11 and the matching circuit 12 of the antenna 1 according to the first embodiment. Accordingly, the description thereof will be omitted. In addition, the meandering parts 23a and 23b have the same configuration as the meandering part 13a and 13b according to the first embodiment except that the lengths of the plurality of sides forming the meandering parts 13a and 13b in the direction orthogonal to the longitudinal direction are constant and the number of meandering of the meandering parts is different from that of the meandering parts according to the first embodiment. Further, the radiating parts 24a and 24b have the same configuration as the radiating parts 14a and 14b except that the sides are cut in the longitudinal direction of the antenna 20 so that the ends 241a and 241b facing the meandering parts 23a and 23b are narrower than the widest portions of the radiating parts 24a and 24b.

In the antenna 20 shown in FIG. 6, the ends 241a and 241b of the radiating parts 24a and 24b facing the meandering parts 23a and 23b are narrower than the widest portions of the radiating parts 24a and 24b. Accordingly, similar to the antenna 1 according to the first embodiment, the lengths of the portions, where the ends 241a and 241b of the radiating parts 24a and 24b facing the meandering parts 23a and 23b face the sides of the meandering parts 23a and 23b closest to the radiating parts 24a and 24b in the direction orthogonal to the longitudinal direction can be smaller than the widths of the widest portions of the radiating parts 24a and 24b. As a result, similar to the first embodiment, it is possible to suppress the electrostatic coupling occurring between the radiating parts 24a and 24b and the sides of the meandering parts 23a and 23b closest to the radiating parts 24a and 24b. Therefore, the deterioration of the radiation efficiency can be suppressed in the desired wavelength range.

According to the above-described embodiment, the ends 241a and 241b of the radiating parts 24a and 24b facing the meandering parts 23a and 23b are narrower than the widest portions of the radiating parts 24a and 24b. For this reason, the lengths of the portions, where the ends 241a and 241b of the radiating parts 24a and 24b facing the meandering parts 23a and 23b face the sides of the meandering parts 23a and 23b closest to the radiating parts 24a and 24b among the plurality of sides of the meandering parts 23a and 23b in the direction orthogonal to the longitudinal direction are smaller than the widths of the widest portions of the radiating parts 24a and 24b, that is, the widths of the ends of the antenna 20. Therefore, the radiating parts 24a and 24b are provided to increase the bandwidth of the antenna, and it is possible to adjust the length of the path by the meandering parts 23a and 23b, thereby improving the radiation efficiency in the desired wavelength range. In addition, it is possible to suppress the electrostatic coupling occurring between the radiating parts 24a and 24b and the sides of the meandering parts 23a and 23b closest to the radiating parts 24a and 24b. Therefore, the deterioration of the radiation efficiency can be suppressed in the desired wavelength range. As a result, it is possible to provide an antenna having a large bandwidth and an RFID tag having a large bandwidth.

Third Embodiment

An RFID tag according to this embodiment is formed so that the lengths of the sides forming the meandering parts in the direction orthogonal to the longitudinal direction are constant, and the ends of the radiating parts facing the meandering parts decrease as coming close to the meandering parts in the RFID tag according to the first embodiment.

Figure 7:
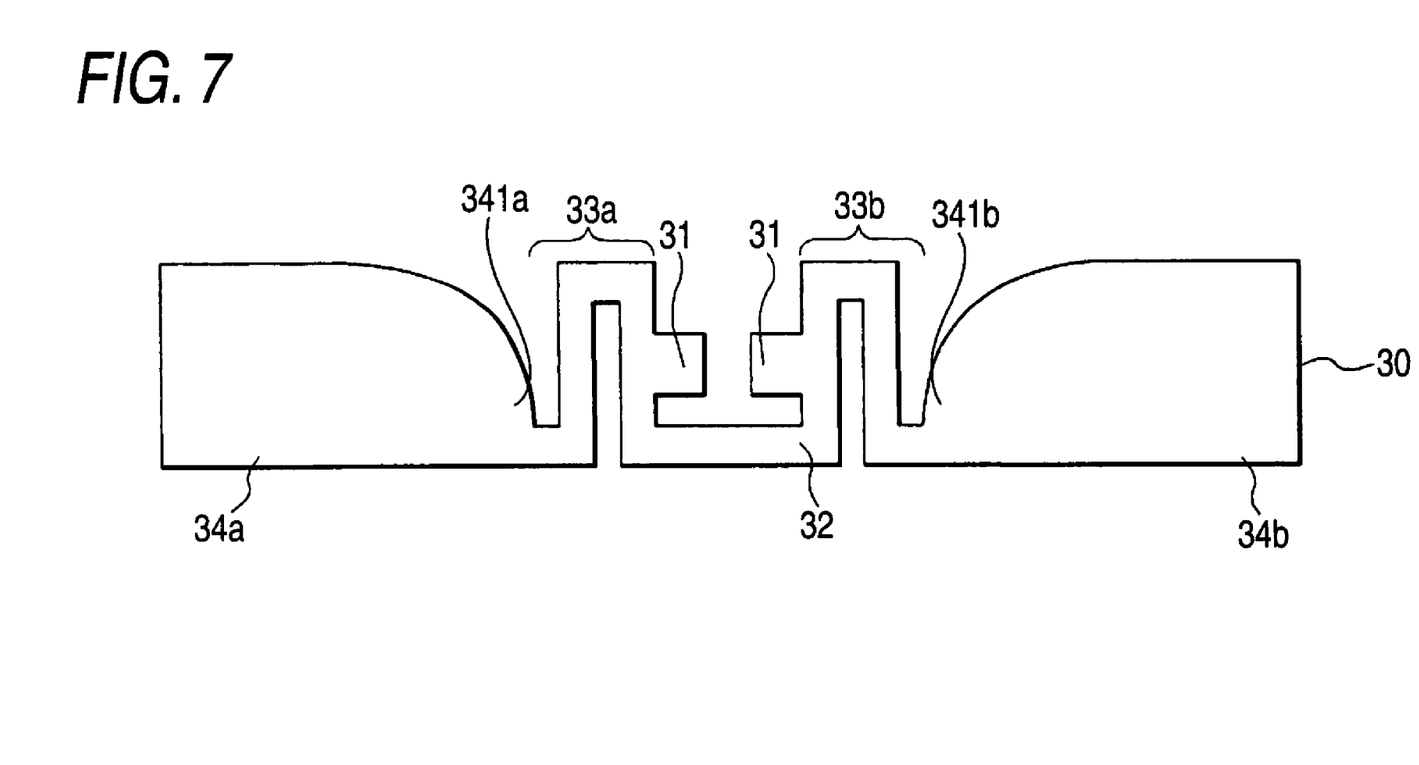
FIG. 7 is a plan view of an antenna according to a third embodiment of the invention.

FIG. 7 is a view showing the configuration of an antenna of the RFID tag according to this embodiment. In FIG. 7, the antenna 30 includes power feeding parts 31, a matching circuit 32, meandering parts 33a and 33b, and radiating parts 34a and 34b. The power feeding parts 31 and the matching circuit 32 have the same configuration as the power feeding parts 11 and the matching circuit 12 of the antenna 1 according to the first embodiment. Accordingly, the description thereof will be omitted. In addition, the meandering parts 33a and 33b have the same configuration as the meandering parts 13a and 13b according to the first embodiment except that the lengths of the plurality of sides forming the meandering parts 13a and 13b in the direction orthogonal to the longitudinal direction are constant and the number of meandering of the meandering parts is different from that of the meandering parts according to the first embodiment. Further, the radiating parts 34a and 34b have the same configuration as the radiating parts 14a and 14b except that the sides on one side of the antenna are cut in the longitudinal direction of the antenna 20 so that the widths of the radiating parts 34a and 34b decrease as coming close to the meandering parts 33a and 33b and the widths thereof to be decreased are exponentially increased.

In the antenna 30 shown in FIG. 7, ends 341a and 341b of the radiating parts 34a and 34b facing the meandering parts 33a and 33b are narrower than the widest portions of the radiating parts 34a and 34b. Accordingly, similar to the antenna 1 according to the first embodiment, the lengths of the portions, where the ends 341a and 341b of the radiating parts 34a and 34b facing the meandering parts 33a and 33b face the sides of the meandering parts 33a and 33b closest to the radiating parts 34a and 34b in the direction orthogonal to the longitudinal direction, can be smaller than the widths of the widest portions of the radiating parts 34a and 34b. As a result, similar to the first embodiment, it is possible to suppress the electrostatic coupling occurring between the radiating parts 34a and 34b and the sides of the meandering parts 33a and 33b closest to the radiating parts 34a and 34b. Therefore, the deterioration of the radiation efficiency can be suppressed in the desired wavelength range.

Figure 8:
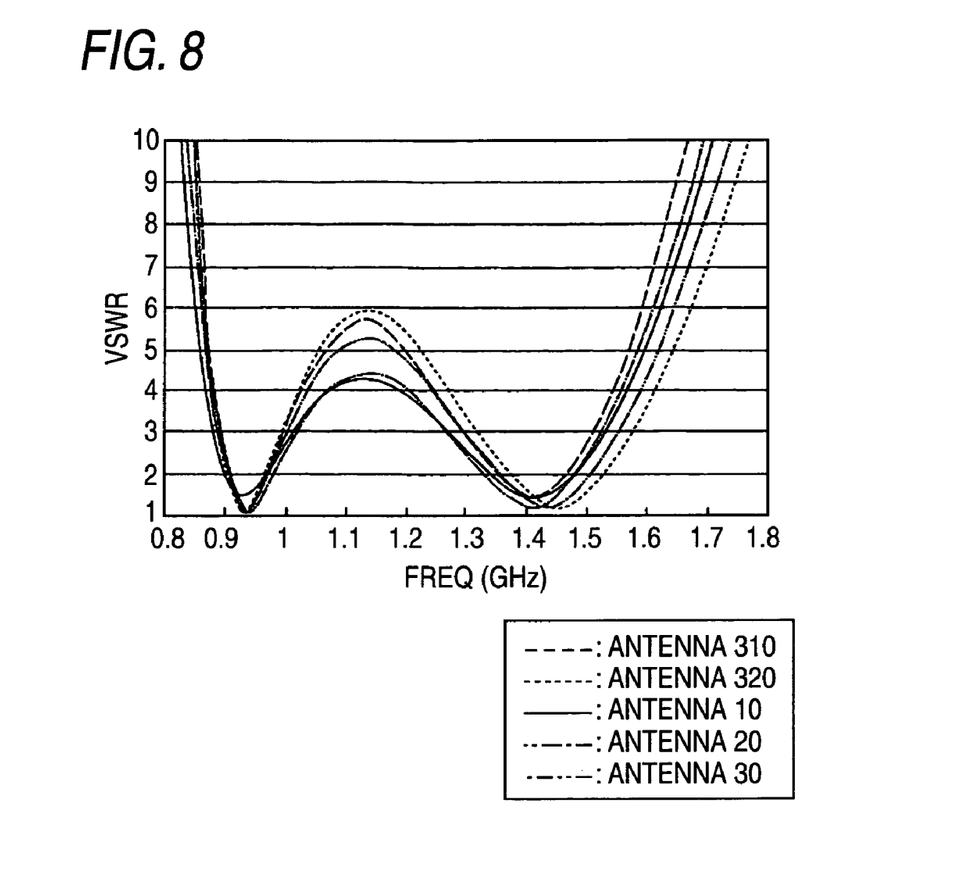
FIG. 8 is a view showing results of a simulation.
Figure 9:
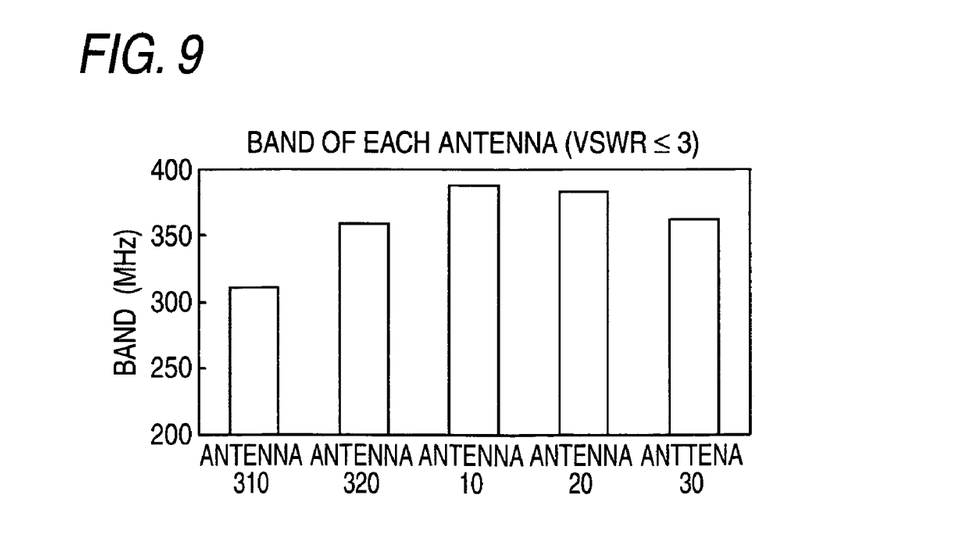
FIG. 9 is a view showing a relationship between the shape and the band of the antenna.

Similar to FIG. 4, FIG. 8 shows results of a simulation that is performed to obtain a voltage standing wave ratio by means of the antennas shown in FIGS. 1, 2, and 3 and the antenna shown in FIGS. 6 and 7.

FIG. 5 shows bands, where the value of the VSWR shown in FIG. 4 is equal to or smaller than 3, of the antennas shown in FIGS. 1, 2, and 3.

As shown in FIGS. 6 and 7, the antenna 20 described in the second embodiment and the antenna 30 described in the third embodiment includes the antenna 310 not having a radiating part or the antenna 320 having the meandering parts 323a and 323b and the radiating parts 324a and 324b. Meanwhile, the VSWRs of the antennas 20 and 30 are further improved than that of the antenna 320 having a constant width. Therefore, it is understood that the bandwidths of the antennas are sufficiently increased.

According to the above-described embodiment, the widths of the portions of the radiating parts 34a and 34b facing the meandering parts 33a and 33b decrease as coming close to the meandering parts 33a and 33b. For this reason, the lengths of the portions, where the ends 341a and 341b of the radiating parts 34a and 34b facing the meandering parts 33a and 33b face the sides of the meandering parts 33a and 33b closest to the radiating parts 34a and 34b among the plurality of sides of the meandering parts 33a and 33b in the direction orthogonal to the longitudinal direction are smaller than the widths of the widest portions of the radiating parts 34a and 34b, that is, the widths of the ends of the antenna 30. Therefore, the radiating parts 34a and 34b are provided to increase the bandwidth of the antenna, and it is possible to adjust the length of the path by the meandering parts 33a and 33b, thereby improving the radiation efficiency in the desired wavelength range. In addition, it is possible to suppress the electrostatic coupling occurring between the radiating parts 34a and 34b and the sides of the meandering parts 33a and 33b closest to the radiating parts 34a and 34b. Therefore, the deterioration of the radiation efficiency can be suppressed in the desired wavelength range. As a result, it is possible to provide an antenna having a large bandwidth and an RFID tag having a large bandwidth.

Further, in the embodiment, in particular, the widths of the portions of the radiating parts 34a and 34b facing the meandering parts 33a and 33b decrease as coming close to the meandering parts 33a and 33b. As the distances between the radiating parts 34a and 34b and the meandering parts 33a and 33b decrease, the lengths of portions, where the radiating parts 34a and 34b face the meandering parts 33a and 33b, in the direction orthogonal to the longitudinal direction decrease. Therefore, it is possible to decrease the electrostatic coupling, and to improve the radiation efficiency.

In the invention, any structure in addition to the structure according to the first to the third embodiment may be used so that the lengths of the portions, where the ends of the radiating parts facing the meandering parts face the sides closest to the radiating parts among the plurality of sides of the meandering parts in the direction orthogonal to the longitudinal direction, are smaller than the widths of the widest portions of the radiating parts. Even in this case, it is possible to suppress the electrostatic coupling occurring between the radiating parts and the sides of the meandering parts closest to the radiating parts. Therefore, the deterioration of the radiation efficiency can be suppressed in the desired wavelength range. As a result, it is possible to provide an antenna having a large bandwidth and an RFID tag having a large bandwidth.

For example, in the first embodiment, instead of the radiating parts 14a and 14b, radiating parts (not shown) having a constant width may be provided for the antenna. For this reason, the lengths of two or more sides, facing the radiating parts, among the plurality of sides of the meandering parts 13a and 13b in the direction orthogonal to the longitudinal direction decrease as coming close to the radiating parts. In addition, the lengths of the portions, where the ends of the radiating parts facing the meandering parts 13a and 13b face the sides closest to the radiating parts among the plurality of sides of the meandering parts in the direction orthogonal to the longitudinal direction, may be smaller than the widths of the widest portions of the radiating parts.

It is preferable that the ends of the radiating parts facing the meandering parts be narrower than the widest portions of the radiating parts and the lengths of the sides closest to the radiating parts among the plurality of sides of the meandering parts in the direction orthogonal to the longitudinal direction be equal to or smaller than the widths of the ends of radiating parts facing the meandering parts. The reason is as follows: Although being not as strong as electrostatic coupling occurring between the radiating parts and the portions facing the radiating parts, electrostatic coupling also occurs between the portions, which do not face the radiating parts, of the sides closest to the radiating parts among the plurality of sides of the meandering parts and the radiating parts. For this reason, the lengths of the sides closest to the radiating parts among the plurality of sides of the meandering parts in the direction orthogonal to the longitudinal direction are equal to or smaller than the widths of the ends of the radiating parts facing the meandering parts, thereby suppressing the electrostatic coupling as much as possible to avoid the deterioration of the radiation efficiency.

The invention is not limited to the embodiments described above, and has various modifications. It should be understood that the various modifications are included in the scope of the invention.

As described above, the antenna according to the embodiment of the invention is used as an antenna for an RFID tag, in particular, an RFID tag for UHF band.

What is claimed is:

1. An antenna for an RFID tag, comprising:
   a power feeding part adapted to feed power to an integrated circuit of the RFID tag;
   a radiating part adapted to transmit or receive a radio signal; and
   a meandering part connecting the power feeding part and the radiating part, the meandering part including a plurality of sides extending in a first direction, wherein:
   the power feeding part, the meandering part, and the radiating part are arranged in a second direction orthogonal to the first direction;
   the radiating part has a first side extending in the first direction and having a first length;
   the meandering part has a first side extending in the first direction which is farthest from the power feeding part and opposes the first side of the radiating part;
   a gap is formed between the first side of the meandering part and the first side of the radiating part; and
   a length of the radiating part in the second direction is longer than the first length.

2. The antenna as set forth in claim 1, wherein:
   the radiating part has a second side extending in the first direction and having a second length longer than the first length;
   the first side of the meandering part has a third length shorter than the second length.

3. The antenna as set forth in claim 2, wherein:
   a second side of the meandering part which is closer to the power feeding part than the first side of the meandering part has a fourth length longer than the third length.

4. The antenna as set forth in claim 1, further comprising:
   a matching circuit connected to the power feeding part.

5. The antenna as set forth in claim 1, wherein:
   the radio signal is of UHF band.

6. The antenna as set forth in claim 1, wherein respective portions of the power feeding part, the meandering part, and the radiating part are aligned in the second direction.

7. An RFID tag, comprising:
   a dielectric substrate;
   an integrated circuit disposed on the dielectric substrate; and
   an antenna disposed on the dielectric substrate, the antenna comprising:
   a power feeding part adapted to feed power to the integrated circuit of the RFID tag;
   a radiating part adapted to transmit or receive a radio signal; and
   a meandering part connecting the power feeding part and the radiating part, the meandering part including a plurality of sides extending in a first direction, wherein:
   the power feeding part, the meandering part, and the radiating part are arranged in a second direction orthogonal to the first direction;
   the radiating part has a first side extending in the first direction and having a first length;
   the meandering part has a first side extending in the first direction which is farthest from the power feeding part and opposes the first side of the radiating part;
   a gap is formed between the first side of the meandering part and the first side of the radiating part; and
   a length of the radiating part in the second direction is longer than the first length.

8. The antenna as set forth in claim 7, wherein respective portions of the power feeding part, the meandering part, and the radiating part are aligned in the second direction.

* * * * *